Nov. 17, 1959          R. G. PIETY          2,913,170
ELECTROLYTIC ANALOGUE FOR APPROXIMATELY SIMULATING
EXTENSIONS IN SPACE TO INFINITY

Filed July 16, 1954          10 Sheets-Sheet 1

INVENTOR.
Raymond G. Piety
BY
Hudson & Young
ATTORNEYS

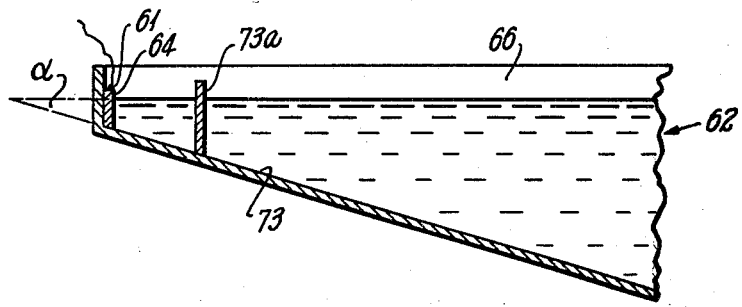
Fig. 5ª
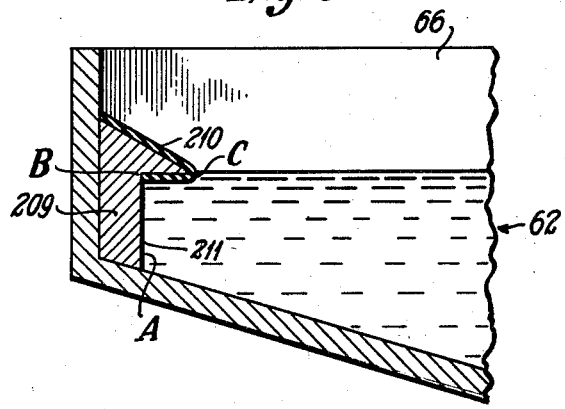
Fig. 6.
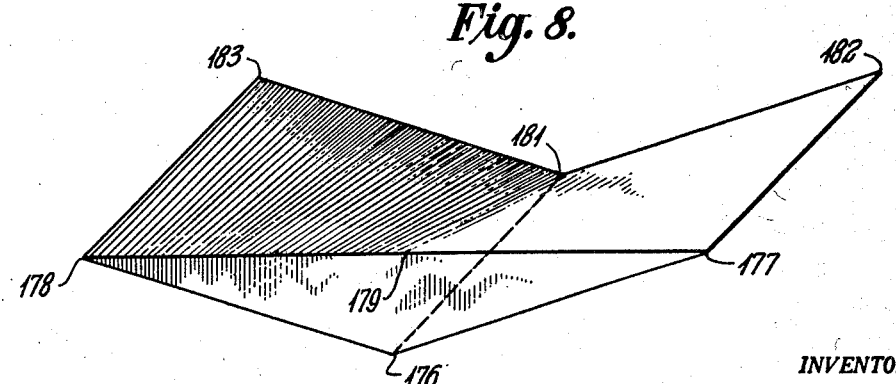
Fig. 8.
INVENTOR.
Raymond G. Piety
BY
ATTORNEYS INVENTOR.
Raymond G. Piety
BY
Hudson & Young
ATTORNEYS

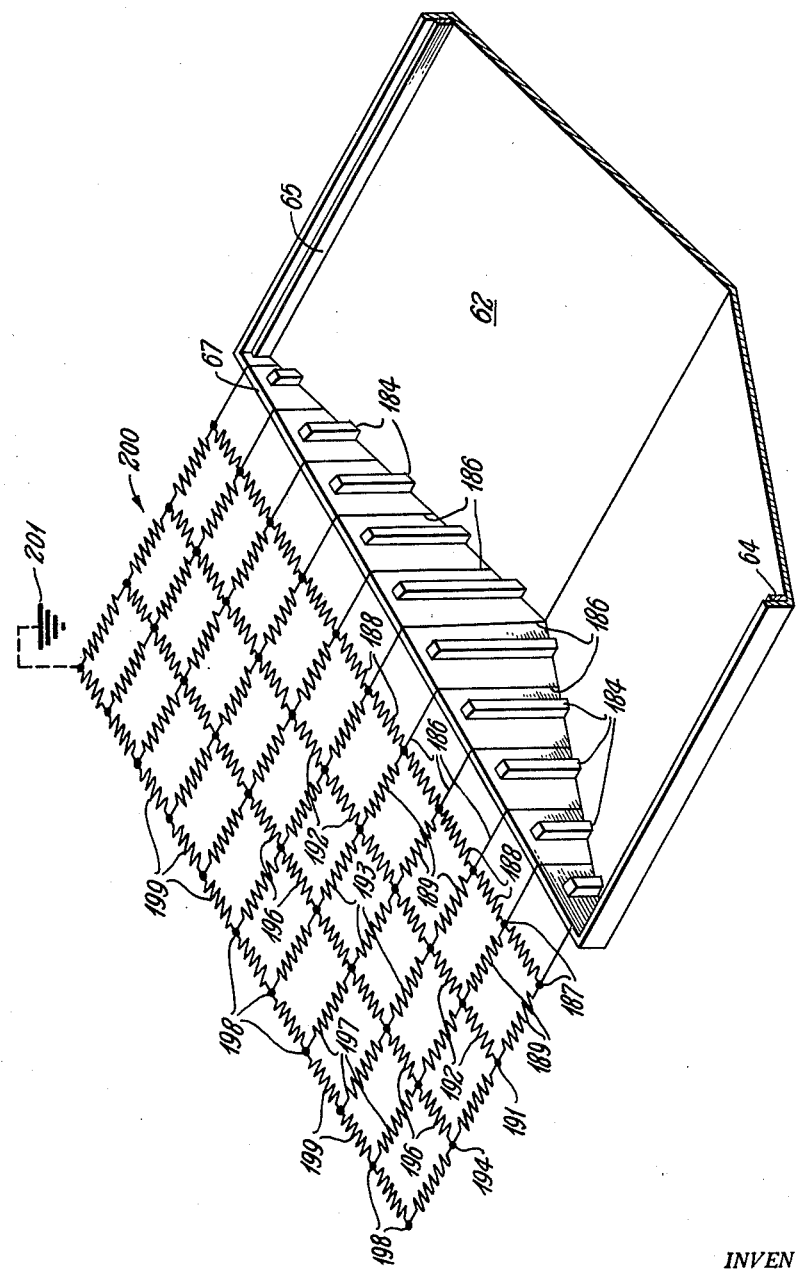

Nov. 17, 1959  R. G. PIETY  2,913,170
ELECTROLYTIC ANALOGUE FOR APPROXIMATELY SIMULATING
EXTENSIONS IN SPACE TO INFINITY
Filed July 16, 1954  10 Sheets-Sheet 7

INVENTOR.
Raymond G. Piety
BY
Hudson & Young
ATTORNEYS

Nov. 17, 1959                R. G. PIETY                2,913,170
ELECTROLYTIC ANALOGUE FOR APPROXIMATELY SIMULATING
EXTENSIONS IN SPACE TO INFINITY
Filed July 16, 1954                            10 Sheets-Sheet 8
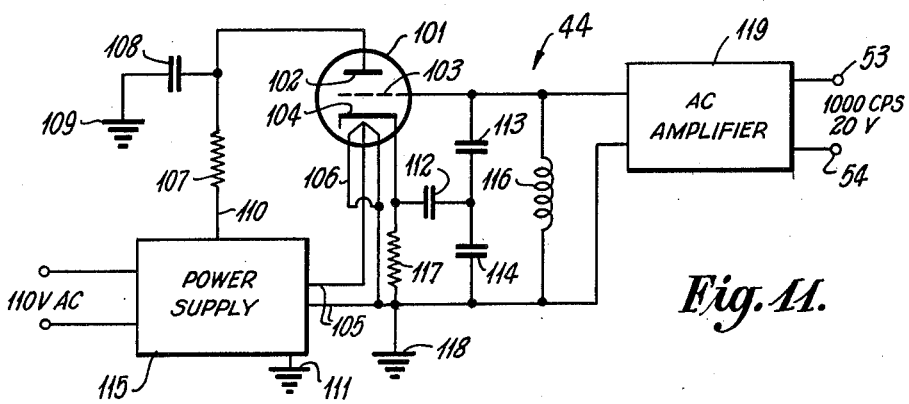
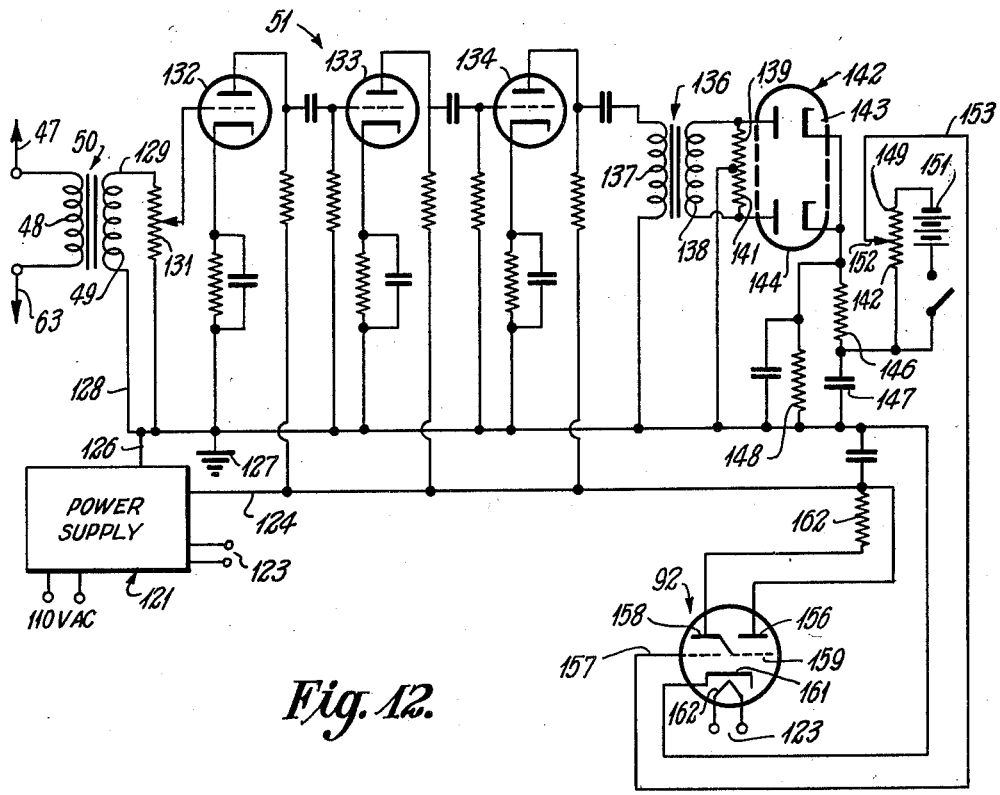
INVENTOR.
Raymond G. Piety
BY
Hudson & Young
ATTORNEYS INVENTOR.
Raymond G. Piety
BY
ATTORNEYS United States Patent Office 2,913,170
Patented Nov. 17, 1959

2,913,170

ELECTROLYTIC ANALOGUE FOR APPROXIMATELY SIMULATING EXTENSIONS IN SPACE TO INFINITY

Raymond G. Piety, Bartlesville, Okla., assignor to Phillips Petroleum Company, a corporation of Delaware Application July 16, 1954, Serial No. 443,817

12 Claims. (Cl. 235—61.6)

This invention relates to the analysis of electrical fields which obey Laplace's equation. In one aspect this invention relates to the analysis of gravitational, electrostatic, magnetic, electric, and velocity potentials which satisfy Laplace's equation. In another aspect, this invention relates to the principle of inversion applied to the solution of certain problems involving Laplace's equation as related to well bore logging. In another aspect, this invention relates to a potentiometric method for investigating the fundamentals of electrical logging. In still another aspect, this invention relates to an electrical analogue. Other aspects will be evident from that which follows.

In drilling for oil it is desirable to obtain information which will identify the geological strata pierced by the drill hole. Among other methods developed to accomplish this purpose are methods of electrical well logging wherein certain physical properties associated with the different formations surrounding the well bore are determined. The most important property, from the standpoint of electrical well logging, is the electrical resistivity of the formations. The electrical resistivity of different formations varies widely due to the quantity and quality of fluid contained therein. In the electrical logging technique currents are set up in the mud or liquid in the well bore and in the formations surrounding the well. A system of electrodes is employed to measure the currents and observed potentials are plotted against well depth to give what are called "self potential" and "resistivity" logs.

While these logs yield much valuable information their interpretation, in the past, has depended upon theoretical considerations difficult or impossible to verify in actual wells. A system wherein the large number of unknowns involved could be eliminated or reduced was needed. To fill this need electrical analogue or potentiometric models of a well bore and its surrounding formations have been developed. These models are employed to study the fundamentals involved in electrical logging. The electrical analogue or model technique is based upon the analogy between the flow of a fluid in a porous medium and the flow of electricity in a conductor.

An electrical analogue or model for studying well logging problems comprises a pool or body of electrolyte, having a shape analogous to that of the well bore and its surrounding formations, and a system of electrodes for setting up and measuring potentials in said electrolyte. Prior art electrical analogue systems have made use of a wedge-shaped trough or tank in the form of a single right triangle, with the center of the well bore being represented along the apex formed by the hypotenuse and the side opposite the second largest angle of said triangle. The wedge can be considered a "slice" or segment of a cylinder having the borehole axis as the axis of the cylinder. In such a system as this, the formation is terminated abruptly along the base of the right triangular wedge opposite the well bore. This abrupt termination causes perturbation in the flow of electrical current and, therefore, studies made in such a model do not represent actual formation structure because such formations, for practical purposes, extend to infinity within the earth. Further, in prior art electrolytic tanks it is difficult if not impossible to measure potentials across two formations separated by barriers due to abrupt termination of the formation.

An object of this invention is to provide a method and means for simulating extension to infinity the region of interest in an electrical model.

Another object of this invention is to provide an improved potentiometric method for investigating the fundamentals of electrical logging.

Still another object of this invention is to provide an improved electrical analogue which simulates the actual conditions found in earth formations which extend to infinity from a well bore.

Other objects of the invention are: to provide an electrical model of a formation or formations wherein perturbations in the region of interest due to termination of the model are negligible; to provide a scaled down model of an earth formation which is capable of evaluating equal potential surfaces and lines of current flow to a great distance from a well bore; to provide an electrical analogue making use of the principles of inversion or the geometric process of imaging to determine potentials at infinite distance in the region of interest; to provide an improved apparatus for making and plotting equal potential surfaces in lines of current flow; and to provide improved electronic circuits for making studies involving equal potential surfaces or lines of current flow in applying transformation by inversion to the study of formations.

Other objects and advantages of the invention will be apparent from the detailed description which follows and from the accompanying drawings.

I have found that the principles of cylindrical inversion, whereby points within a cylinder can be transformed to points without said cylinder, and vice versa, can be employed in electrical logging to transform points of equal potential determined within a region of "real space" to corresponding points of equal potential without said region of "real space" or vice versa. In other words, in a model for studying the fundamentals of electrical logging, points of equal potential determined within a convenient distance surrounding a simulated well bore can be transformed or extended to great distances, or to infinity, from said simulated well bore. The advantages of such a method are clear. Perturbations in the flow of electrical current caused by the abrupt termination of the model are eliminated. Studies made when employing a model adapted to carry out the method of my invention represent studies of actual formations in the earth because such formations, for practical purposes, extend to infinity. Further, because of the method of my invention electrical analogues or models of convenient size and fully capable of giving accurate results can be constructed. I have devised such a model.

Thus, according to the invention, there is provided a potentiometric method for investigating the fundamentals of electrical logging by determining field distribution of electrical forces on a system, which comprises: establishing a system or model which will conduct electrical current and which is comprised of a first zone and a second zone, said first zone representing a portion of an actual formation and in which first zone flowing electrical currents represent currents which would flow in said formation, said second zone representing an extended portion of said formation and in which second zone flowing electrical currents represent currents which would flow in said extended formation; imposing an electrical current on said system or model; and determining a point of potential in one of said first and second zones.

Further, according to the invention, there is provided a potentiometric model for investigating the fundamentals of electrical logging which comprises: an electrically conductive body of substantially triangular cross section composed of two contiguous substantially right triangular shaped sections; a reference locus or point within each of said sections, said reference loci serving as means for imposing an electrical potential on said body; and means for determining points of equipotential within said body with respect to said reference loci.

In a presently preferred embodiment the electrically conductive body of the invention comprises an electrolyte contained in an elongated tank or trough having a V-shaped bottom. The electrolyte in said tank has a shape like that of an isosceles triangle formed of two right triangular shaped sections of equal area joined together in a common base which bisects the angle of said V in said tank.

The invention will be more fully understood from a consideration of the attached drawings and the descriptions thereof which follow.

Figure 5A is an end section view showing the elongated electrode employed in the trough of Figure 5.

Figure 6 is a cross section of the anti-meniscus electrode of the invention as employed in the trough of Figure 5.

Figure 8 is a perspective view of a block having a developable surface and which can be employed as a "terminating" means in the trough of Figure 5.

Figure 9 is a perspective view of an impedance network installed in one end of the trough of Figure 5 as a "terminating" means.

Figure 11 shows the oscillator which supplies the A.C. signal for use in the trough of Figure 5.

Figure 12 shows an amplifier and null indicating circuit employed in connection with the present invention.

Cylindrical inversion can be defined as taking points within a cylinder, on a plane normal to the axis of said cylinder, and transforming them to points without the cylinder. Conversely, points without the cylinder can be transformed to points within the cylinder. The essential property of this inversion as applied to the present invention is that the same electrical potential function solves Laplace's equation in the two inversely related geometries. In both instances the product of the distances of the points, before and after transformation, from the axis of the cylinder is equal to the square of the radius of the cylinder.

Figure 1:
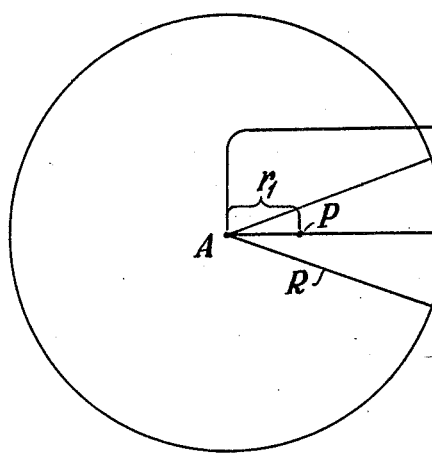
Figure 1 illustrates the basic principles of cylindrical inversion as applied to the invention.

For example, referring to Figure 1, assume that the circle shown represents a horizontal cross section made by a plane normal to the vertical axis A of a cylinder of radius R. If the sector of the circle is folded out as shown by the dotted lines, i.e. it is inverted, the point A at the center of the circle becomes the point A', the center of an inverted or reciprocal circle. Further, a point P, say $r_1$ inches from A, becomes point P' which is located $r'$ inches from A' the center of the reciprocal circle. The distance from A to P is a real distance measured in real space and is denoted by $r_1$, whereas the distance from A' to P' is a distance measured in reciprocal space and is denoted by $r'$. From the above, it is seen that for every point P at a real distance, $r_1 < R$, within the cylinder of inversion, and in the normal plane, there is an inverse point P' at a distance $r'$ from A' in infinite space without the cylinder and in the same plane. The relation between the two distances, $r_1$ and $r'$, in the two inversely related geometries, can be expressed by the equation (1) $$r_1 r' = R^2 \text{ or } r_1 = \frac{R^2}{r'} \text{ or } r' = \frac{R^2}{r_1}$$

Further, letting R equal unity for simplicity, it is readily seen that $r_1$ and $r'$ are reciprocals of each other. As stated, for every value of $r_1$ within the cylinder there is a corresponding value of $r'$ without the cylinder. As $r_1$ varies from unity to zero, $r'$ varies from unity to infinity.

However, the distance from A' to P', i.e., $r'$, represents or positions an inverse or reciprocal point at a real distance $r_2$, measured from A, to outside the cylinder of inversion in the same plane as $r$ and $r'$. We now have two cases involving the measurement of a real distance in real space, said real distance being denoted by $r_1$ and $r_2$ in the two cases. If we let $r$ represent either $r_1$ or $r_2$, the above Equation (1) can be written (2) $$rr' = R^2$$

Since $r_2$ represents a distance of $r$ in real space measured from A (but extending from A to outside the cylinder) when we substitute $r_2$ for the unknown $r$ in the above Equation 2 we obtain (3) $$r_2 r' = R^2 \text{ or } r_2 = \frac{R^2}{r'}$$

which gives a value of $r_2$ greater than R, thus locating the inverse or reciprocal point outside the cylinder of inversion and represented by $r'$.

Again, letting R equal unity for simplicity, it is readily seen that $r$ and $r'$ in the equation $rr' = R^2$ are reciprocals of each other. Every value of $r$ measured within the cylinder is equal to the actual real distance $(r_1)$ only and it is not necessary to use the equation. For every value of $r'$ measured from A' there is a corresponding value of $r$ measured from A to a point outside the cylinder (the distance to which is denoted in Figure 1 as $r_2$) which is greater than R. As $r'$ varies in value from R down to zero the value of $r$ in real space measured from A varies from R to infinity. Therefore, for every value of $r'$ we can find a value of $r$ in real space measured from A.

Making use of this principle in a properly designed electrical analogue system representing a well bored into the earth and the formations through which the well is bored, for every point determined within a given cylinder of formation, the axis of which is the bore hole, there will be a corresponding inverse or reciprocal point without the said given cylinder of formation, i.e., at a greater distance out in the formation. It will be shown below in connection with Figure 5 that electrical potential measurements made in the electrical analogue of this invention satisfy the cylindrical inversion formula. Thus, the method of the invention, when applied to a properly constructed electrical analogue system, permits measurements to be made without errors due to perturbations caused by termination of the model. Such measurements are, therefore, more nearly like those that would be encountered in actual earth formations which, for practical purposes, extend to infinity.

Figure 2:
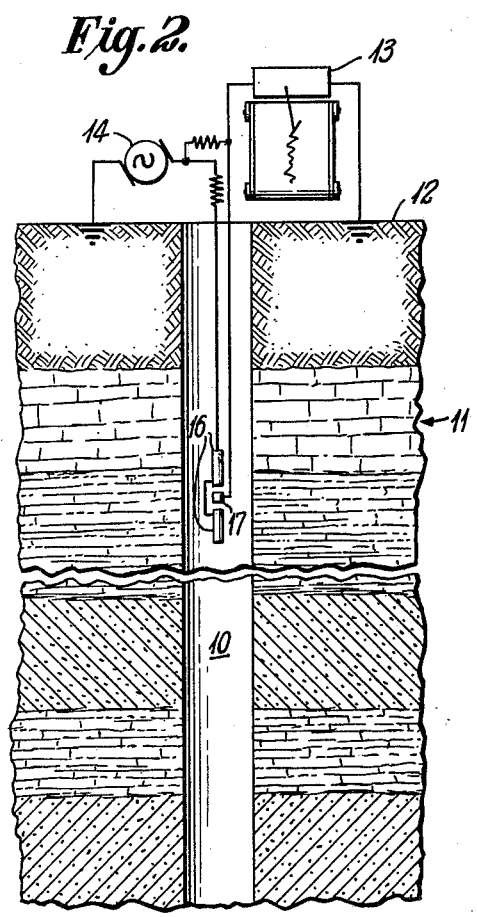
Figure 2 illustrates a simplified logging system as used in an actual well bore in the earth.

In Figure 2 a plurality of earth formations 11 are shown extending to infinity for all practical purposes. Well bore 10 is drilled through the various formations in the earth. Electrode 16 is a guard electrode made into two sections and electrode 17 is a pickup electrode in a guard electrode logging system. Electrode 16 is connected to source 14 of electrical potential which is grounded at the surface of the earth. Either alternating or direct current can be used in this type of electrical logging. Electrode 17 is connected to a recorder 13, grounded at the surface of the earth, for measuring the electrical potential which passes from electrode 16 through the formations and is picked up by electrode 17. Passage of electrical current occurs in planes extending in all directions, all of which planes include the bore hole axis. This fact permits the slicing of the formations into sectors as will become apparent in the explanation of this invention. Obviously, electronic circuits such as amplifiers, etc., would be used in such a system as shown in Figure 2, and may be considered a part of the recorder 13.

Figure 3:
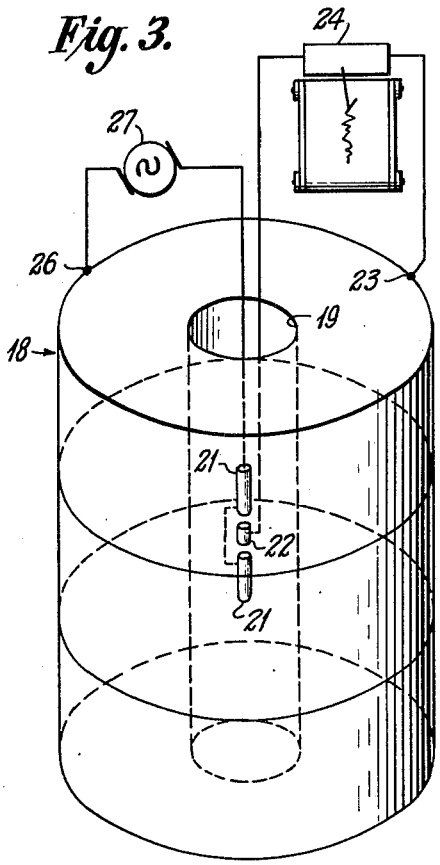
Figure 3 illustrates diagrammatically a log being taken inside of a hole drilled within a core taken from a well bore.

Figure 3 shows a core sample taken from a well bore by means of a well known diamond core bit. A small hole 19 has been drilled through core 18 to permit the taking of an electric log by the simple system shown in Figure 1. Electrodes 21 and 22 represent generating and pick-up electrodes respectively. Electrode 21 is connected to potential source 27 grounded at 26. Pick-up electrode 22 is connected to recorder 24 which is grounded at 23. In making a log as shown in Figure 3 it is obvious that perturbations in the flow of electric current will result because of the abrupt change in structure, at the outer surface of the core, i.e., between the core 18 and the surrounding air. Therefore, measurements of the electric current clearly do not represent the structures which for practical purposes extend to infinity as shown in Figure 2.

Figure 4:
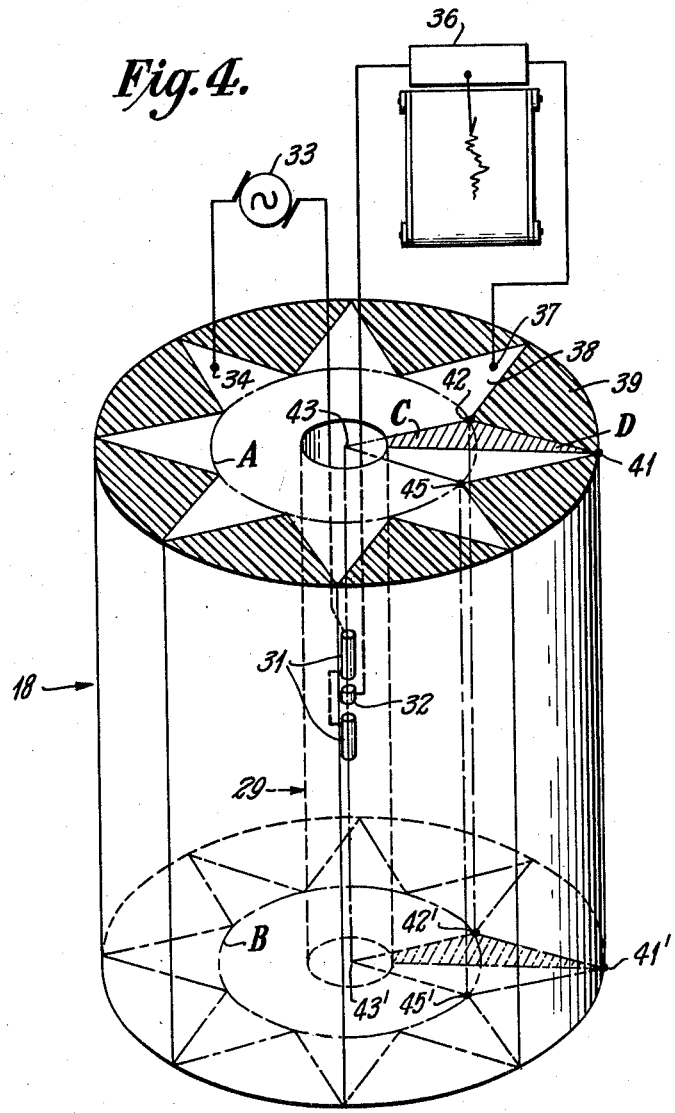
Figure 4 illustrates diagrammatically an application of the present invention to a log being taken within the core of Figure 2.

Figure 4 represents one application of the present invention making use of transformation by inversion to simulate measurements made in formations which extend to infinity. In Figure 4 core 18, defined at its top and bottom by planes engendered in circles A and B, is surrounded by a plurality of triangular shaped segments 38 and 39. Triangular segments 38 are made of a material such as clay, sand, shale, etc., having substantially the same electrical properties as core 18. Triangular segments 38 represent space, such as enclosed in the segment defined at its top by the area 42, 43, 45 of the circle A, which has been transformed by inversion into the segment defined at its top by the area 42, 41, 45, i.e., all of the points within a given sector of the core have been transformed by a geometrical transformation to an area outside the core. Triangular segments 39, which fit into the spaces between segments 38, are made of inert or non-conducting materials such as rubber, plastic, or wood coated with an insulating paint. The segment of the core and a contiguous segment 38 forming a body defined by 43, 42, 41, 45, at its top end and 43', 42', 41', 45', at its bottom end, could be removed from the remainder of the cylinder and added triangular segments, and studies made by passing the logging electrodes along the apex identified by line 43, 43' since the lines of current flow pass in uninterrupted planes.

Electrodes 31 and 32 represent pick-up and generating electrodes respectively. Electrode 31 is connected to a source potential 33 which is grounded at 34 in one of segments 38. Electrode 32 is connected to recorder 36 which is grounded at 37 in one of the segments 38.

Figure 5:
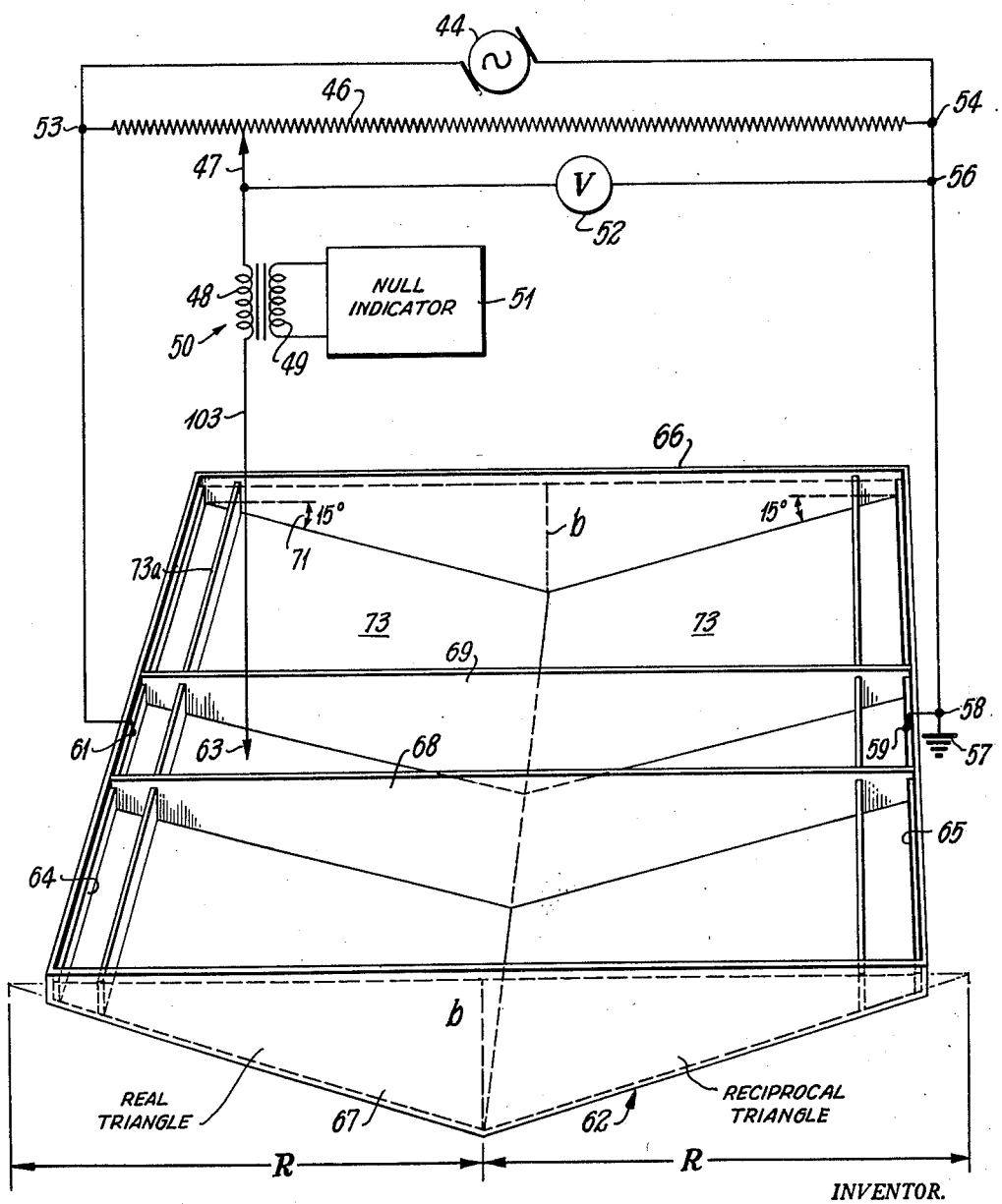
Figure 5 is a perspective view, partly in section, of a model, and schematic electronic circuits designed and constructed to carry out the method of the invention.

From the explanation which follows in connection with the description of Figure 5, it can be seen how segments 38 of Figure 4 (when added to the core 18 as shown) will provide an improved electrical log since the abrupt termination of the core in a flat surface is not present. The core, in effect, has been extended electrically to a great distance or to infinity.

From Figure 4 it can be seen that it would be impossible to study formations over any great depth because cores are not usually available. It is the purpose of this invention to employ the principles just developed in an electrical analogue comprising an electrolytic tank. It is to be understood that this tank while shown as containing liquids, can be made up of solids in which event the model can be placed on end similar to the core section shown in Figure 4. To facilitate the use of liquids in the model, its axis (the borehole axis) is disposed horizontally instead of vertically with the two bottoms of the tank sloping downward toward each other. The liquid in the tank thus assumes the shape of two right angle triangles with their bases b (Fig. 5) joining, the bottom of the tank forming two sides of the triangles and the liquid level the other. The analogy between a model employing a tank containing a liquid and a model made up of solids is evident when one considers the shaded, triangular shaped segment of Figure 4 defined by 43, 42, 41 at its top and 41', 42', and 43' at its bottom. This triangular shaped segment is one-half of one of the segments 38 and one-half the corresponding core segment subtending said segment 38. This double triangular segment represents a segment of the formation or formations surrounding the bore hole and the corresponding segment of real, and reciprocal or inverted space.

Figure 5 is a perspective view of one form of a model constructed to carry out the method of the invention. Throughout the specification and in the claims, unless so stated otherwise, the word "apex," when used to denote an apex of a right triangle, means that apex formed by the hypotenuse and the side opposite the second largest angle of said triangle. In connection with Figure 5 "apex" refers to the apex opposite the bases b. Other models employing the principles of the invention and adapted to carry out the method thereof can be constructed by those skilled in the art in possession of this disclosure. The model of Figure 5 is completely analogous to that represented by the shaded triangular segment shown and described in connection with Figure 4. In Figure 5 there is illustrated a tank or trough 62 constructed of non-conducting material such as painted wood, plastic, rubber, etc. In the present model the tank is approximately 6 feet long and approximately 36 inches wide at the top. However, tanks of other dimensions can be employed. Sloping bottoms 73 make an angle of 15 degrees with the top of end closures 66 and 67 as shown at 71. Angles of other sizes can be employed. The "surface" between the bases of the triangles of Figure 5 is flat whereas that between the segments C and D of Figure 4 is curved like a cylinder. An angle of 15 degrees was chosen because it is small enough to eliminate electrical errors, due to the cylindrical surface and the tangential surface forming the bases of the triangles. For small angles the tangential base of the cylindrical surfaces can be considered to be the same length. In carrying out the method of the invention tank 62 is filled with an electrically conductive liquid. Transverse barriers 68 and 69 can be employed to separate liquids of different electrical characteristics and thus simulate different formations. Electrodes 64 and 65 are of conductive material such as metal or graphite and extend longitudinally the entire length of the tank.

Pick-up electrode 63 is employed in determining points of equipotential in the liquid in the tank. The remainder of the electrical equipment shown will be described below in connection with the description of the operation of the model of Figure 5.

As stated the liquid in the tank assumes a triangular shape, i.e., it has the shape of two right angle triangles with a common base $b$. In accordance with the analogy between the models of Figures 4 and 5 the left-hand triangle, i.e., the triangle containing the bore hole axis, represents a given segment of the formation or formations surrounding the bore hole and corresponds to C in Figure 4. This triangle is designated as the "real triangle" in Figure 5. The other triangle of Figure 5 is designated "reciprocal triangle" and represents inverted or reciprocal space corresponding to D in Figure 4. Distances from electrode 64 to a point of potential in the "real triangle" represent real distances in the formation surrounding the bore hole. Distances from electrode 65 to a point of potential in the "reciprocal triangle" represent reciprocals of real distances from electrode 64 and can be converted into real distances out in the formation from the bore hole axis by means of the formula $rr'=R^2$ as discussed in connection with Figure 1.

To justify employing this invention for representing the characteristics of formations in reciprocal or inverted space the infinite cylinder formulas must be satisfied. In the infinite cylinder formula $$V - V' = K \log \frac{r'}{r}$$

V is the voltage at a point P within a cylinder at a distance $r$ from the center of the cylinder, $V'$ is the voltage at a point outside the cylinder at a distance $r'$ from the center of the reciprocal or inverted cylinder and K is a constant. If this formula is satisfied by actual measurement of potentials in the real space ("real triangle") and in the reciprocal space ("reciprocal triangle") of the model of the invention it proves that potential determinations in reciprocal or inverted space of the model can be employed to represent characteristics of formations extended to infinity by said reciprocal space in accordance with the invention. When employing the particular model of the invention illustrated in Figure 5, $V'$ is considered to be at zero potential because electrode 65 is grounded through contacts 59 and 58 to ground 57. The above infinite cylinder formula then becomes $$V = K \log \frac{r'}{r}$$

In this formula since $V'$ is grounded, the value of $r'$ becomes a fixed distance (the radius of the electrode which is 1.84 inches) and therefore only two variables V and $r$ remain in the equation.

Continuing with the description of the model shown in Figure 5, it will be seen that measurements made in the model do satisfy the above formula. In operation of the model, voltage generator 44, which preferably produces one thousand cycles per second at 20 volts, supplies potential to contacts 53 and 54 on what may be considered a Wheatstone bridge. One thousand cycle A.C. source is used for convenience in order that measured potentials can be separated from 60 cycle line pickup. Connected between contacts 53 and 54 is a potentiometer 46 having a wiper 47. A vacuum tube voltmeter 52, such as described in patent application Serial Number 258,270, filed November 26, 1951, by D. R. de Boisblanc, is connected between wiper 47 and contact 56 in the bridge circuit. Contact 53 is connected to contact 61 on electrode 64 and contact 58 of the bridge circuit is connected to electrode 65 at contact 59. Contacts 56, 58, and 59 are all connected together and grounded at 57. Wiper 47 of potentiometer 46 is connected through primary winding 48 of a transformer 50 to a pick-up electrode 63 which is employed to make contact with the liquid in tank 62. The second winding 49 of transformer 50 is connected to a null indicating device 51 which will be described later in connection with Figure 12.

In making potential measurements using the model shown in Figure 5, the wiper 47 is first moved to a point near contact 53 until voltmeter 52 reads 20 volts. Pick-up electrode 63 is placed in the tank and moved across the tank from a point near electrode 64 towards electrode 65 until a point is reached where null indicator 51 gives a null indication, meaning that the bridge made up of resistances in potentiometer 46 and the resistances across the tank on either side of pick-up electrode 63 in the tank 62 are equal. The point where this null reading first occurs with the voltmeter initially set at 20 volts is 1.84 inches from the apex of the right triangle forming the real space, i.e., the "real triangle." This is a point on a line of equipotential and will be on electrode 64. This process is repeated by first changing the reading of voltmeter 52 to a fixed number of volts such as 19, 18, 17, etc., down to zero and then moving pick-up electrode 63 across the tank from electrode 64 toward electrode 65 until a null indication occurs for each voltage. The results of the measurements made using the arrangement of Figure 5 are shown in Table I.

Table I

| Voltage | Location of Points of Equipotential in Tank 62 Distance Measured in Inches | |
|---|---|---|
| | From Apex of "Real Triangle"— Real Distance $r$ | From Apex of "Reciprocal Triangle"— Reciprocal Distance $r'$ |
| 20 | 1.84 | |
| 19 | 2.20 | |
| 18 | 2.69 | |
| 17 | 3.68 | |
| 16 | 4.72 | |
| 15 | 6.01 | |
| 14 | 7.74 | |
| 13 | 9.71 | |
| 12 | 12.34 | |
| 11 | 16.46 | |
| 10 | 20.24 | |
| 9 | [1] 25.4 | 15.55 |
| 8 | [1] 32.6 | 12.04 |
| 7 | [1] 42.3 | 9.34 |
| 6 | [1] 54.3 | 7.25 |
| 5 | [1] 68.5 | 5.75 |
| 4 | [1] 86.6 | 4.55 |
| 3 | [1] 106.6 | 3.70 |
| 2 | [1] 136.0 | 2.90 |
| 1 | [1] 171.5 | 2.30 |
| 0 | [1] 214.0 | 1.84 |

[1] Calculated.

For voltage values of 20 to 10 inclusive the points of equipotential between electrodes 64 and 65 were found to be in the "real triangle." Thus, the values of $r$ given above are the distances of pick-up electrode 63 from electrode 64 for each of said voltages. This distance represents a real distance out in the formation from the bore hole axis.

For voltage values of 9 and less the points of equipotential between electrodes 64 and 65 were found to be in the "reciprocal triangle." Thus, the values of $r'$ given above are the distances of pick-up electrode 63 from electrode 65 for each of said voltages. This distance represents the reciprocal of a real distance from the bore hole axis. The values of $r$, real distance, for voltages values of 9 and less are calculated.

In calculating the values of real distance $r$, the reciprocal distance $r'$ is divided into the altitude squared ($R^2$) of the triangle, in accordance with the equation $rr'=R^2$ as explained in connection with Figure 1. This equation gives the real distance $r$ of a point of potential, found to be in the "reciprocal triangle," from the apex of the "real triangle," i.e., the bore hole axis. In other words, the formations represented by the "real triangle" have been extended. For example, the 9 volt point of equipotential was found to be 15.55 inches from the apex of the reciprocal triangle. R, the radius of the cylinder of inversion, i.e., the altitude of the real triangle in tank 62, is 19.84 inches. Then using the above equation $$r = \frac{(19.84)^2}{15.55} = 25.4 \text{ inches}$$

Figure 10:
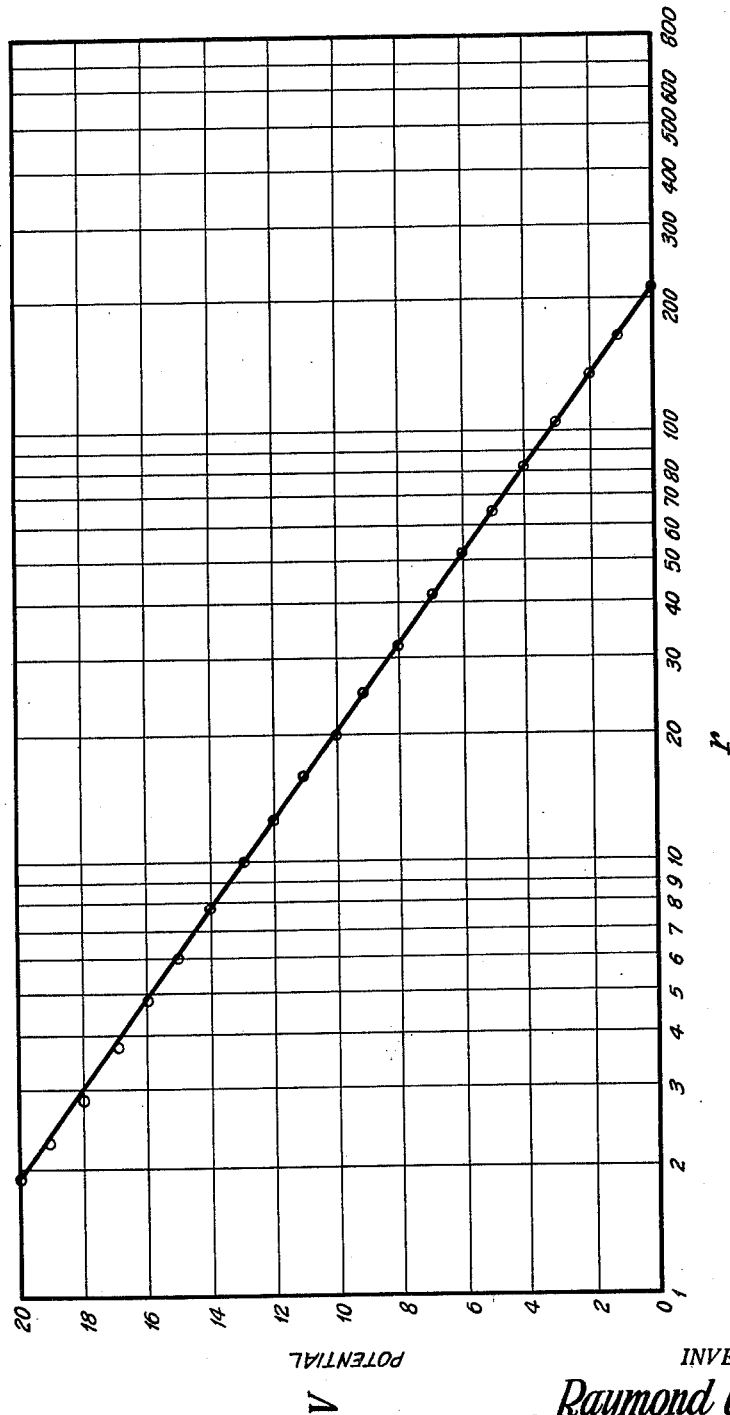
Figure 10 is a plot of equal potential measurements made in the trough of Figure 5 demonstrating the proof of the principles of the invention.

Thus, the real distance of the 9 volt point of equipotential from the bore hole axis of the model (apex of "real triangle") is 25.4 inches. This figure multiplied by the scale factor of the model will give the distance out in the formation from the actual bore hole for the formations being studied. Similarly, from Table I it can be seen that at the 1 volt point of equipotential the measured reciprocal distance is 2.3 inches from the apex of the "reciprocal triangle" while the real simulated distance is 171.5 inches from the bore hole axis. Plotting the data of Table I on semi-logarithm paper as shown in Figure 10 gives a straight line proving that potential determinations made in the reciprocal space of the tank (the "reciprocal triangle") can be employed to represent characteristics of formations extended to infinity by said tank. In other words, this tank satisfies the infinite cylinder formulas and provides means, for evaluating lines of equipotential, not provided by prior art methods.

In using Figure 5 to carry out the above tests the barriers 68 and 69 were not used. As stated above, barriers 68 and 69 are used to separate liquids of different electrical characteristics and thus simulate different formations in making drill hole measurements. The barriers should preferably have an electrical resistance of the same order of magnitude as the fluids forming the formation. The barriers cannot be porous as to allow diffusion of one liquid into the other but are constructed so as to allow flow of current across same. The barriers may be made of balsa wood having a conducting painted surface, or paper painted with a conducting paint. In one preferred embodiment of this invention an entire section, say between barrier 68 and 69, may be made of agar-agar by mixing 20 grams of material with each liter of water and being left to form one formation. The electrical properties of the agar-agar can be changed by adding a salt such as copper sulfate or sodium chloride in different concentrations to the mixture. The entire tank can be filled with agar-agar with different sections containing a different concentration of the salt to represent different formations having different electrical characteristics. Other conducting plastics may be used as the barriers between the formations. Conducting plastics such as those sold by the Markite Corp., 155 Waverly Place, New York, N.Y., and Emerson-Cuming, Canton, Massachusetts, can be used. Also, the electrolyte can be a solution of a salt such as copper sulfate, sodium chloride, etc. It is within the scope of the invention for the electrically conductive body to be comprised of a network of resistance elements.

The longitudinal barrier 73a was not employed in connection with the above described tests. Such a barrier can be used to simulate the effect of the bore hole wall in logging operations. Barrier 73a is constructed similarly to barriers 68 and 69. Means should be provided to conduct electricity through or over the barrier but it should not be conductive longitudinally.

Figure 5A shows diagrammatically the relation between the apex of the "real triangle" formed by the liquid in the tank and electrode 64. Electrode 65 (not shown) is similarly positioned in the "reciprocal triangle." The actual axis for this system (axis of well bore) is 1.84 inches outside the tank beyond electrode 64, with the opposing electrode being at 65 and the apex of the reciprocal triangular cross section being 1.84 inches beyond electrode 65. This feature is used since it would be nearly impossible to use an electrode at exactly the point where the liquid's edge touches a flat surface of the tank extended. The liquid is 0.5 inch deep at electrodes 64 and 65. In the model constructed the angle $\alpha$ is 15°; therefore, the horizontal distance outside the tank where the liquid surface and the bottom of the tank intersect is 1.84 inches.

$$1.84 \text{ inches} = \frac{0.5}{\tan 15°}$$

1.84 inches thus represents the effective radius of the electrode. Clearly the electrode height could be greater or less than 0.5 inch thus making the effective radius of the electrode greater or less than 1.84 inches.

Figure 6 shows one type of elongated electrode employed in tank 62. One of the earliest observations concerning the V-shaped tank was that there existed at the electrodes a variable meniscus height that complicated the computations on the tank. To eliminate this meniscus effect, an anti-electrode 209 was designed with a cross-section as shown in Figure 6. The wedge shaped insulator top 210 serves to constrict the lines of current flow to the ⅛" face 211 of the electrode in addition to eliminating the variable meniscus by the action of the slightly greater than 90° angle ABC. Electrode 209 was made of brass and the insulator top 210 formed by coating that portion with a non-conducting plastic. Obviously the entire electrode could be made of plastic with the face 211 of metal. Suitable leads (not shown) connect face 211 with the measuring circuit shown in Figure 5.

Figure 7:
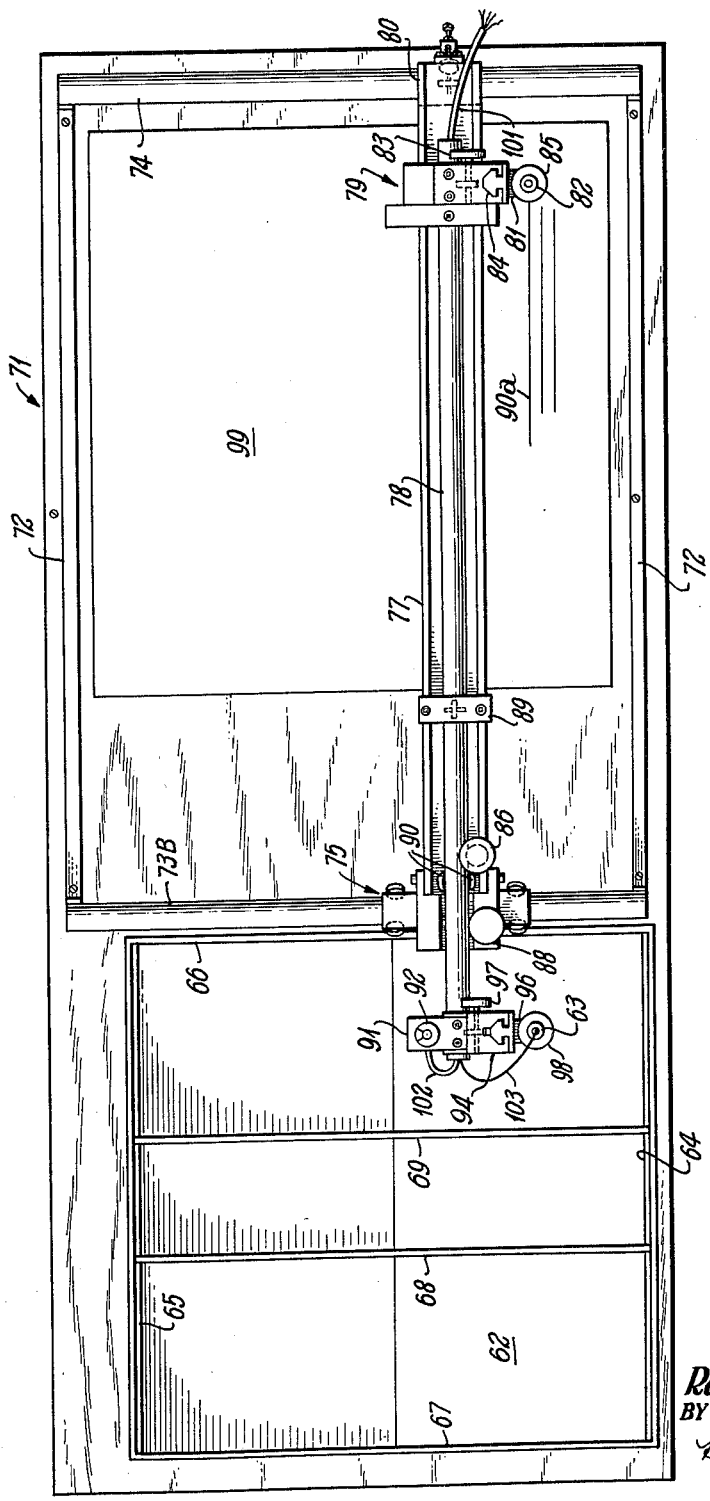
Figure 7 is a plan view of the plotting table, tank and plotting equipment for plotting lines of equal potential on plotting paper employed in connection with the trough of Figure 5.

Figure 7 is a plan view of the tank 62, and the plotting board assembly supported on a table 71. Reference numerals are the same as those used in connection with Figure 5 insofar as possible. The tank 62 is mounted towards one end and the plotting board assembly at the opposite end of the table. 72 represents the metal framework which is used to hold tracks 73B and 74 in place on the table. Tracks 73B and 74 are cylindrical tubes of metal. Mounted on tracks 73B and 74 is a U-shaped metal rail 77 which travels transversely with respect to table 71 on parallel tracks 73B and 74. Rail 77 is mounted at three points of suspension with two points or rollers being on track 73B in mounting assembly 75 and one roller on track 74 in unit 80 to assure contact with the level tracks at all times. The rollers in units 75 and 80 which mount rail 77 permit plotting head 81 and pick-up electrode 63 to be moved transversely across the tank and plotting paper 99 together. A metal support tube 78 is mounted on roller assemblies 79, 89, and 90 which permit said tube 78 to be moved longitudinally with respect to table 71 and tank 62 in the U portion of rail 77. The two rollers 90 support tube 78 in rail 77 near the tank 62 and one roller in assembly 79 provides the third point of suspension. The roller in assembly 89 is advantageous when the electrode assembly is at the far end of the trough near end plate 67. The above described means of mounting tube 78 permits pick-up electrode 63 and plotting head 81 to move back and forth together, across tank 62 and plotting paper 99, respectively, in any direction in one plane. Knurled knob assembly 86 mounted on rail 77 provides a means via a friction wheel for moving tube 78 and pick-up electrode 63 and plotting head 81 back and forth in rail 77. Similar knurled knob assembly 88 mounted on assembly 75 provides means for moving pick-up electrode 63 and plotting head 81 along tracks 73B and 74.

Cable 101 passes through tube 78 to null indicator unit indicated generally as 91 mounted at the pick-up electrode end of tube 78. An electrical lead in cable 101 designated as 103 is connected through the pick-up electrode assembly head to the pick-up electrode 63.

It will be noted in plotting head 81, attached to unit 79 and tube 78, that there are two adjusting knobs 82 and 83. Adjusting knob 83 operates a spur gear which matches rack gears 84 permitting movement up and down of the plotting needle in plotting head 81. Knurled knob 85 provides an adjustment for removal of the plotting pencil from the plotting paper 99 without adjusting its original pressure setting as determined by 83. Knob 82 permits manual placing of the plotting pencil against the paper when knob 85 has released the pencil from contact with the paper. Adjusting knob 97 on pick-up electrode assembly head 94 operates to raise and lower the pick-up electrode 63. Adjusting knob 98 permits vernier adjustment of the pick-up electrode 63 and is hollow to permit passage of electrical lead 103 to electrode 63. Lines 90a represent lines of equipotential on plotting paper 99. From the above description of Figure 7 it can be seen that for every movement of pick-up electrode 63 in tank 62 it is possible to plot a point on plotting paper 99 at the exact corresponding position. The depth at which the pick-up electrode penetrates the fluid is adjustable as is the pressure applied to the plotting pencil.

In accordance with the principles of this invention, it is apparent that consideration should be given to the bottom and top of the well bore in the tank. In other words, the end surfaces of the tank cause perturbations due to termination of the model in the same manner as the sides do. Since the surface of the earth is flat, the flat triangular end of the tank representing the top of the well bore will simulate actual conditions. The bottom end of the well bore is terminated in the earth by formations which extend to infinity and therefore the simulation of this condition must be considered. To terminate the down hole or bottom hole conditions in accordance with the principles of this invention a structure shown in Figure 8 preferably is employed. Figure 8 represents a block of wood covered with non-conductive paint or plastic and is solid, but can be hollow. The entire block can be made of plastic or other non-conductive materials.

In Figure 8 the section defined by 178, 179, 177 and 176 represents a triangular cross section end of a block or member which is inserted in the end of the tank at the end corresponding to the bottom of the well bore. The opposite end of this block is shown as lines 183—181 and 181—182. The block is made such that it will set into the tank 62 previously described, and a developable surface made up of surface area bounded by 183—181—179—178, which will taper from line 183—181, toward straight line 178—179—177, is formed. Likewise, a second developable surface made up of surface area bounded by 181—182—177—179, which will taper from line 181—182 to straight line 177—179—178, is formed. A developable surface is a surface that can be developed or rolled out, on a plane, without stretching or shrinking. The developable surfaces in this invention are formed by an infinite number of straight lines extending from consecutive points along line 183—181 and line 181—182 to corresponding consecutive points along line 178—179 and line 179—177, respectively; line 178—179 and line 179—177 being one straight line. These two developable surfaces have a continuous change in slope and thus reciprocal space measured at points below the lines 183—181 and 181—183, can be represented as real distances below the bottom of the well bore when the block of Figure 8 is placed in the tank and measurments in the formation below the bottom of the well bore are desired, or its effects considered while making other measurements. It will be apparent that the fluid representing the formation below the bottom of the drill hole will fill up the volume formed above the developable surfaces of the block shown in Figure 8 when it is placed within the tank. The width of the block in Figure 8 measured along the line 178—179—177 is approximately 36 inches and its depth measured along either line 178—183 or line 177—182 is approximately 18 inches. The distance between points 179 and 176 corresponds to the depth of the tank.

A second method of terminating the down hole or bottom hole conditions in accordance with this invention is shown in Figure 9. The end of the tank 62 which represents the down hole portion is designated as triangular member 67. Evenly spaced along triangular member 67 between electrodes 64 and 65 are a plurality of bars 184 extending from top to bottom of member 67. Bars 184 are of insulating material such as painted wood, plastic, or rubber and divide the electrolyte in the tank near 67 into sections. Alternating with and between bars 184 is a plurality of conductors 186 which extend parallel to bars 184 up the side and across the top of member 67 and are each connected to a terminal of the plurality of terminals 187 outside of tank 62. Between terminals 187, extending effectively across the width of the tank and serving as connecting points are a plurality of resistances 188. The values of resistances 188 preferably are approximately 2000 ohms near the electrodes 64 and 65 and vary progressively downward in value to approximately 100 ohms for the resistances effectively near the center of the tank. 200 denotes an electrical resistance network used for simulating down hole conditions or formations which extend to infinity and includes resistances 188. Also, making up network 200 which simulates different depths into the earth are resistances 189, 193 and 197 which progress from a high resistance of the order of 2,000 ohms for resistance 189 progressively down to a resistance of approximately 100 ohms for resistance 197. Clearly, more resistances can be used in both directions across and parallel with the tank than are shown in Figure 9. The ends of resistance 189 are connected to contacts 187 and 191. Between contacts 191 are resistances 192 which vary in a progressive manner as do resistances 188. Resistances 193 are connected to contacts 194 and 191. Between contacts 194 are a plurality of resistances similar to resistances 188 and vary in resistance in the same manner. Resistances 197 are connected between contacts 194 and 198. Resistances 199 are connected between contacts 198 and represent low resistances as compared to resistances 188 which vary in a decreasing manner towards the center as do resistances 188. The values of resistances 188, 189, 192, 193, 196, 197 and 198 are determined by calculations which obey Laplace's equation. Thus, it can be seen that the electrical network represented by 200 can be used to simulate down hole conditions or formations, below the bottom of the well bore, which extend to infinity. 201 denotes a ground for the network which may or may not be used. Obviously, other methods can be used to terminate the downhole conditions. Obviously, blocks or members as shown in Figure 8 or a resistance network like that of Figure 9 could be employed to terminate both ends of the tank if the conditions being studied make it desirable.

Figure 11 shows the alternating current generator designated as 44 in Figure 5. The 1000 cycle 20 volt generator here described has a power supply 115 grounded at 111 plugged into a 110 volt A.C. line. 115 supplies power to the plate of vacuum tube 101 and heating potential over leads 105 to heater 106. 200 volts are supplied to plate 102 through lead 110 and resistance 107. A capacitance 108 grounded at 109 is connected to a point between resistance 107 and plate 102 for decoupling purposes. The cathode 104 is connected through resistance 117 to ground 118. Grid 103 is connected to inductance 116 which is grounded at 118. Inductance 116 is shunted by capacitances 113 and 114 to form a tuned circuit for the oscillator. The lead between capacitances 113 and 114 is connected to capacitance 112, the opposite side of which is connected between the cathode 104 and resistance 117 to form a return coupling between the output and input of vacuum tube 101. The output of 44 is taken across the tuned circuit and applied to an A.C. amplifier 119. The output of amplifier 119 is applied to contacts 53 and 54 which are the same reference numerals used in Figure 5. Amplifier 119 is a type 88–A amplifier manufactured by Presto Recording Corp. of Paramus, New Jersey.

Figure 12 shows the wiring diagram of the null indicator indicated as 51 in Figure 5. This circuit is contained in unit 91 of Figure 7. In Figure 12 potentiometer wiper 47 of Figure 5 and pick-up electrode 63 of Figure 5 are connected to the primary winding 48 of transformer 50. The secondary winding 49 of transformer 50 couples the picked-up signal with an alternating current amplifier designated generally as 51. Lead 129 from secondary winding 49 is connected through potentiometer 131 and then to ground 127. Lead 128 is connected to the opposite end of secondary winding 49 grounded at 127. The wiper contact of potentiometer 131 is connected to the grid of the first stage of amplification in amplifier 51; namely, the grid of triode 132. Amplifier 51 makes use of three stages of RC amplification using vacuum tubes 132, 133 and 134. The RC circuits of the amplifier 51 are of such dimensions that low frequencies such as 60 c.p.s. line signals are rejected, and the 1000 c.p.s. response is flat. The output from amplifier 51 is fed to the primary winding 137 of transformer 136. The output from transformer 136 is taken from the secondary winding 138, the output leads from which are connected to two rectifying tubes designated generally as 142. The two rectifying tubes 143 and 144 form a full wave rectifier. The secondary winding 138 is shunted by the resistances 139 and 141 center taped to ground 127. The output from full wave rectifier 142 is applied to a voltage divider made of resistances 146 and 148 connected to the cathodes of 143 and 144. The output is taken from a point between resistance 146 and capacitances 147 which is grounded and applied to one terminal of potentiometer 149 shunted by a battery 151. Battery 151 is used to buck out residual voltages which result because alternating current has been used in making the null measurement across the bridge circuit. The output signal from which residual voltages have been removed is taken from the wiper 152 of potentiometer 149 over lead 153. Lead 153 is connected to grid 157 of electron ray tuning indicator tube 92. Grid 157, to which the input signal is applied, is connected into the first section of tube 92 made up of plate 158, grid 157, and cathode 161. The plate 158 is connected to the second grid 159 of the second section made up of target 156, grid 159, and cathode 161. Electron ray indicating tube 160 is a 6E5 tube, more commonly known as the "magic eye tube," and in this case is used as a null indicator, the shadow closing whenever a null indication is obtained across primary winding 48 of transformer 50. Leads 123 supply heater current for heater 162 in tube 160. A high voltage is supplied to lead 124 and the target 156. A lower D.C. potential is applied to plate 158 by means of a volt dropping resistor 162 connected between lead 124 and plate 158. The power supply for this null indicating circuit is indicated generally as 121 which supplies 63 volts A.C. for heater current and a high positive voltage to lead 124 for plate currents for the A.C. amplifier as well as the electron ray tube 92. Leads are not shown connected from the power source to the heaters to simplify the drawing.

Figure 13:
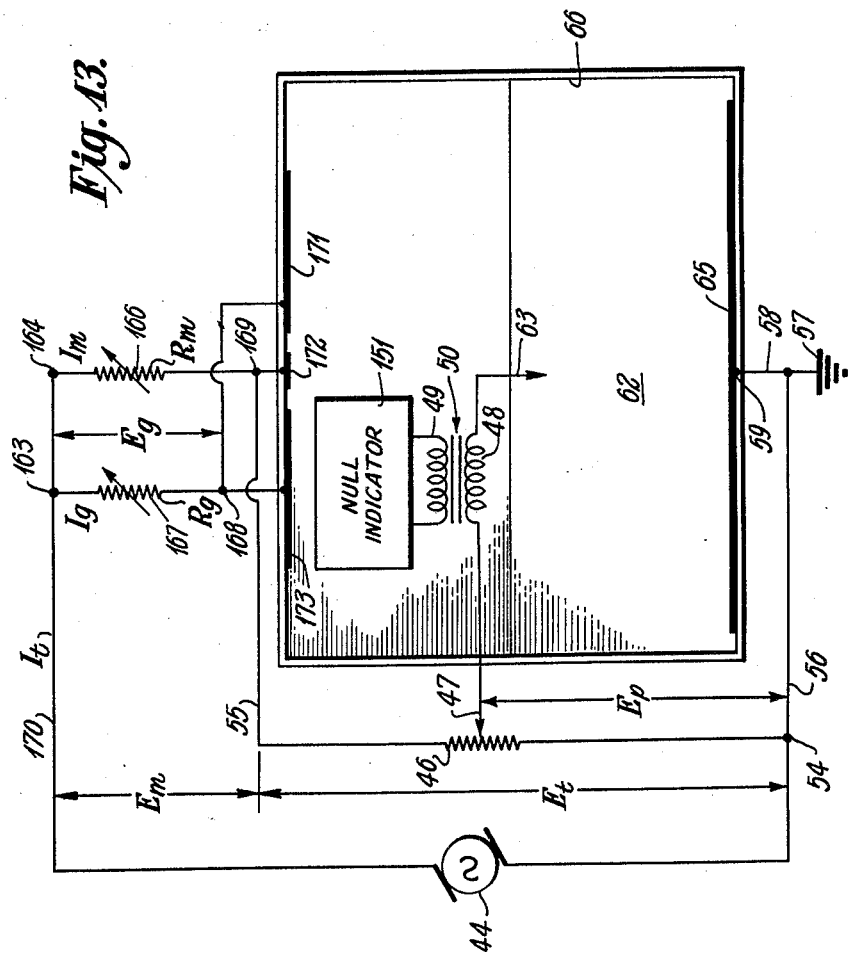
Figure 13 is a plan view illustrating a guarded electrode employed in making measurements in accordance with the present invention.

Figure 13 illustrates a modification of this invention wherein lines of equipotential between a guarded electrode logging device and an infinite electrode or ground are measured and recorded on a plotting paper, such as discussed in connection with Figure 7. The guarded electrode employed in Figure 13 is a model of the guarded electrode described in Patent 2,347,794 issued to R. G. Piety. In Figure 13, 44 indicates a source of 1000 cycle alternating current at 20 volts as employed previously. One side of source 44 is connected through lead 170 to its contacts 163 and 164. The opposite side of source 44 is connected to contacts 54, 56, 58, 59 and ground 57. Contact 58 is connected to contact 59 on electrode 65 which is a conductor as described in connection with Figure 5 and extends the entire length of the tank. Contact 164 is connected through variable resistance $R_m$ designated 166, to contact 169 and the guarded electrode 172. Contact 163 is connected through variable resistance $R_g$ designated 167 and contact 168 to the two guard electrodes 173 and 171. The electrodes 171, 172, and 173 as used in this modification are thin strips of metal with the narrow edge extending into the electrolyte in the tank. Thus, the electrodes represent thin sections from the conventional cylindrical electrodes used in drill hole logging. Contact 169 is connected to contact 55 which serves as one terminal of potentiometer 46, the opposite terminal of which is connected to contact 54. The wiper 47 of potentiometer 46 is connected to the vacuum tube voltmeter $E_p$ designated 52, the opposite side of which is connected to contact 56 and ground 57 through contact 58. Wiper 47 is also connected through the primary winding 48 of transformer 50 which is connected to the pick-up electrode 63. The secondary winding 49 of transformer 50 is connected to the null indicator 51 previously described.

The tank 62 in this case is constructed to a scale 1:6. The guarded electrode logging device is made up of two guard electrodes 171 and 173, each being 20 inches in length which simulate electrodes 10 feet in length in an actual well logging device. The guarded electrode 172 is ½ inch in length simulating the 3-inch guarded electrode used in an actual well logging device. The real width of the tank simulates a distance of approximately 107 feet of formation. As shown in Figure 13 the formation for this study is considered to be homogeneous but the tank could be divided into sections simulating different formations having different electrical characteristics as pointed out previously.

Vacuum tube voltmeters indicated as $E_g$, $E_m$, $E_t$, $E_p$ may be the same voltmeter but are shown being used to take potential measurements at different points in the circuit. Initially it is desirable that the potential on the two guard electrodes 171 and 173 be the same as that of the guarded electrode 172 in order that the current will tend to flow across the tank rather than from one electrode to the other. To render this requirement possible, $R_m$ and $R_g$ are varied until the potential $E_g$ on the guard electrodes 171 and 173 equal $E_m$, the potential on the guarded electrode 172. When the potential on the three electrodes are the same, $E_g$ equals $E_m$, and the current $I_m$ passing through $R_m$, and the current $I_g$ passing through $R_g$, are equal, and the total current $I_t$ passing through the three electrodes equals $I_g + I_m$.

After the preliminary adjustments have been made, the wiper 47 on potentiometer 46 is moved to the end of potentiometer 46 nearest guarded electrode 172. At this time, the potential reading of $E_t$ should approximately equal $E_p$, i.e., 20 volts less than the voltage drop through $R_m$. The potential $E_t$ should remain constant during the time measurements are being taken in the trough. The wiper 47 of potentiometer 46 is then moved to different positions to give different readings of a fixed number of volts such as 20, 19, 18, etc., and the pick-up electrode 63 is then moved about in the tank to determine points of equal potential for each setting of wiper 47. This measurement is made similar to that made in Figure 5 with the two parts of the potentiometer 46 acting as two arms of a bridge circuit with the resistances on either side of the pick-up electrode 63 in the tank forming the other two arms of the bridge.

It will be apparent that Figure 13 is only one example of any system of logging electrodes which may be used with the present invention and is used for illustrative purposes only. The scale of a tank may be changed to meet required electrode sizes, etc. Various formation structures may be simulated in a tank when suitable barriers are used. Clearly, the electrodes 171, 172, and 173 may be moved along the edge of the tank past different formations and measurements taken in the tank simultaneously. The potential source 44 in this instance was chosen as 20 volts, 1000 cycles per second, but other frequencies can be used as well as other voltages. 1000 cycle A.C. was used because it permits filtering which will remove 60 cycle line pick-up.

Figure 14:
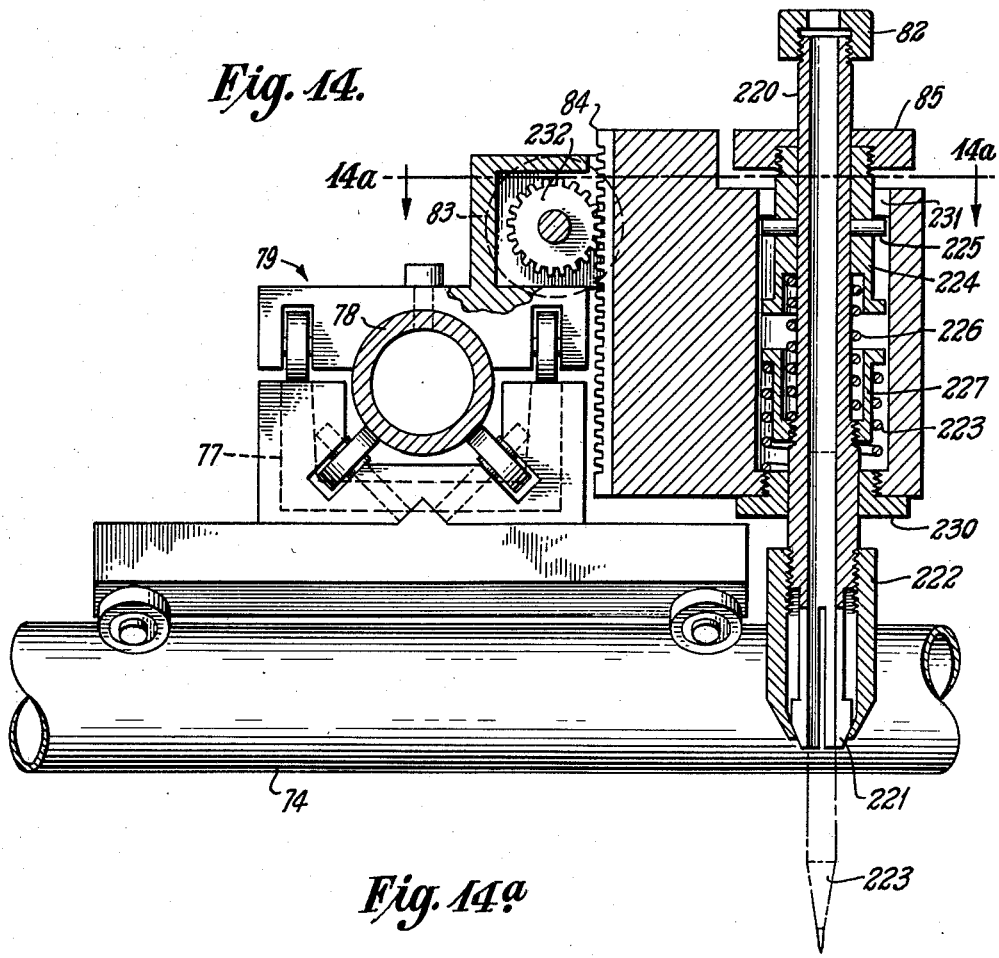
Figure 14 is a cross-section of the plotting head employed in the plotting assembly of Figure 7.
Figure 14A:
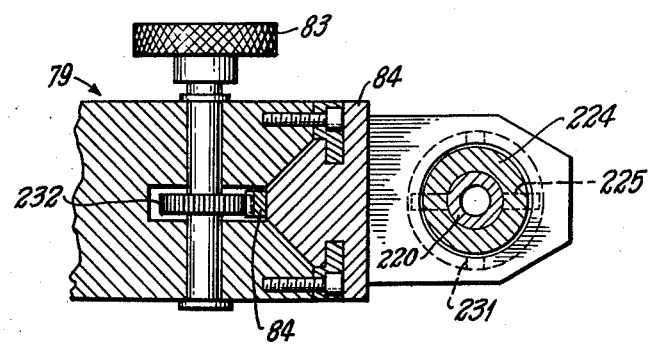
Figure 14A is a cross-section along the lines A—A of Figure 14.

Figures 14 and 14A show in detail the plotting head described generally in connection with Figure 7. Like reference numerals are used where applicable. In Figure 14 spindle 220 mounts a collet 221 and chuck 222 for retaining a pencil 223 or other marking means. A first knob 82 is mounted at the top of spindle 220. A second knob 85 is attached to retainer 224 which fits loosely around spindle 220. A round key 225 is fitted into retainer 224. A spring 226 is mounted between retainer 224 and retainer 227. A second spring 228 is mounted outside retainer 227 and rests on nut 230. As seen in the drawing the knob 85 has been depressed and turned such that key 225 has been passed through keyway 231 and locked in the position shown. Thus, there is a compression of spring 226 and possibly of spring 228 depending upon the setting of spur gear 232 which is adjustable by knob 83. The pencil 223 can be made to mark a heavy or light line depending upon the adjustment of spur gear 232. When it is desired to lift the pencil from the table without changing the spur gear adjustment, it is only necessary to turn knob 85 until key 225 passes through keyway 231 allowing spring 228 to act on retainer 227 and remove the pencil and spindle from the paper. If desired the head can then be moved to another point and knob 82 depressed manually causing the pencil to mark, continuous or intermittent, as desired. When it is desired to make a continuous line as before knob 85 is depressed, causing key 225 to pass through keyway 231, after which knob 85 is rotated to lock said key below said keyway and causing the spindle to hold the pencil on the paper as before since no adjustment was made of spur gear 232. In this manner the same pressure can be maintained on the pencil lead as previously.

While the invention has been described as applied to logging of well bores, it is not to be so limited. The invention can be applied to the study of other electrical and mechanical systems which obey Laplace's equation.

Reasonable variation and modification are possible within the scope of the foregoing disclosure, the drawings and the appended claims to the invention, the essence of which is that a method and apparatus have been provided for investigating the fundamentals of electrical logging by determining field distribution of electrical forces imposed on a system; said method comprising: establishing a model of the system to be studied, said model being comprised of a first zone and a second zone contiguous to said first zone, and where a distance measured in said first zone is a real distance measured from a locus or point referable to said first zone, and where a distance measured in said second zone from a locus or point referable to said second zone is a reciprocal distance representing a corresponding real distance measured from said locus referable to said first zone; and determining the distance of a point of equal potential from one of said loci. Said apparatus comprising: an electrically conductive body of substantially triangular cross section composed of two contiguous substantially right triangular shaped sections; a reference locus within each of said sections, said reference loci serving as means for imposing an electrical potential on said body; and means for determining points of equal potential within said body with respect to said reference loci.

I claim:

1. A potentiometric model for investigating the fundamentals of electrical logging which comprises: an electrically conductive body of substantially triangular cross section composed of two contiguous substantially right triangular shaped sections of equal area joined together at a common base, said common base being opposite the apex of each of said right triangular shaped sections; reference loci within each of said sections, said reference loci serving as means for imposing an electrical potential on said body; and means for determining points of equal potential within said body.

2. A rectilinear model of substantially triangular cross section comprising: a V-shaped trough constructed of non-conducting materials and capable of containing an electrolyte; a body of electrolyte composed of two substantially right triangular shaped sections of equal area joined together at a common base which bisects the angle of said V in said trough; means in each of said sections for transmitting electrical current through said electrolyte; and means for determining points of equipotential within said electrolyte.

3. An electrical analogue for investigating the fundamentals of electrical logging which comprises: an elongated tank having a V-shaped bottom; a body of electrolyte in said tank, said body of electrolyte being composed of two contiguous substantially right triangular shaped sections of equal area joined together at a common base which bisects said V-shaped bottom; elongated electrodes extending along two sides of said electrolyte; means for transmitting electrical current through said electrolyte; means for determining points of certain potentials within said electrolyte; and means for plotting said determined points on a plotting surface.

4. A potentiometric model for investigating the fundamentals of electrical logging of well bores which comprises: an elongated tank having a V-shaped bottom constructed of non-conducting materials; suitable end closures for said tank to render it capable of containing an electrolyte; an elongated body of electrolyte composed of two sections and having a cross section like that of an isosceles triangle formed of a first right triangular shaped section and a second right triangular shaped section of equal area to said first section, said sections being joined at a common base which bisects the angle of said V-shaped bottom; a first elongated electrode positioned in said first section near the apex of said first section; a second elongated electrode positioned in said second section near the apex of said second section; means including said elongated electrodes for imposing an electrical potential on said electrolyte; a mobile pick-up electrode mounted adjacent to said tank and adjustably capable of being extended into and removed from said electrolyte; and means including said pick-up electrode for determining points of equal potential within said electrolyte.

5. Apparatus according to claim 4 wherein a guarded electrode is employed instead of said first elongated electrode.

6. Apparatus according to claim 4 wherein said tank has at least one end closure which comprises a member of non-conductive material having a developable surface for the inner surface thereof.

7. Apparatus according to claim 4 wherein said tank has at least one end closure which comprises a triangular shaped member of non-conducting material conforming to the V-shape of said tank and which has a plurality of conductors extending up the inner side and across the top of said member and connecting to a resistance network outside said tank.

8. Apparatus according to claim 4 wherein said tank has at least one end closure which comprises: a triangular shaped member of non-conducting material conforming to the V-shape of said tank; a plurality of bars of insulating material fixed to and extending from top to bottom of the inner surface of said member, said bars being evenly spaced across said inner surface; a plurality of conductors alternating with and in between said bars; said conductors extending up said inner surface and across the top of said member; and a resistance network outside said tank connected through a plurality of terminals to said plurality of conductors.

9. In an electrical analogue for investigating the fundamentals of electrical logging comprising a tank having a V-shaped bottom, a body of electrolyte in said tank and end closures for said tank, at least one end closure which comprises: a member of non-conductive material defined by, a triangular cross section at one end, a thin V-shaped edge at its opposite end, a first top apex, a second top apex, a bottom apex, an inner developable surface composed of a first developable surface and a second developable surface of equal areas which join at the center line of said inner surface, and two bottom surfaces; said triangular shaped end being the outer end and said V-shaped edge being the inner end when said member is placed in said tank; said first developable surface having a continuous change in slope in a direction from the top of said triangular shaped end to said V-shaped edge and also a continuous change in slope in a direction from said first top apex to said center line; and said second developable surface having a continuous change in slope in a direction from the top of said triangular shaped end to said V-shaped edge and also a continuous change in slope in a direction from said second top apex to said center line.

10. A potentiometric model for investigating the fundamentals of electrical logging of well bores which comprises: an elongated tank having a V-shaped bottom constructed of non-conducting materials; suitable end closures for said tank to render it capable of containing an electrolyte; and elongated body of electrolyte composed of two sections and having a cross section like that of an isosceles triangle formed of a first right triangular shaped section and a second right triangular shaped section of equal area to said first section, said sections being joined at a common base which bisects the angle of said V-shaped bottom; a first elongated electrode positioned in said first section near the apex of said first section; a second elongated electrode positioned in said second section near the apex of said second section; means including said elongated electrodes for imposing an electrical potential on said electrolyte; a mobile pick-up electrode mounted adjacent to said tank and adjustably capable of being extended into and removed from said electrolyte; means including said pick-up electrode for determining points of a certain potential within said electrolyte; a plotting board adjacent said tank; a chart mounted on said plotting board; a plotting head movably mounted adjacent said chart; a marker mounted within said plotting head; means for contacting said marker with said chart; means connecting said pick-up electrode and said plotting head; and means for moving said connected pick-up electrode and plotting head in unison and simultaneously to corresponding positions respectively in said electrolyte and on said chart.

11. An electrical analogue for studying phenomena which obey Laplace's equation by determining field distribution of electrical potential in a system, which comprises: an electrical model of said system capable of conducting electrical current in at least a first right triangular shaped section and a second right triangular shaped section of said model, said sections being of equal cross-sectional area and joined together at a common base opposite the apex of each of said sections, said first section representing real space in said system, said second section being a reciprocal of said first section and representing real space as determined by cylindrical inversion, means within each of said sections for imposing an electrical potential on said system, and means for determining field distribution of electrical potential in said system.

12. In an electrical analogue for investigating the fundamentals of electrical logging, a conductor of electrical current comprising, in combination: a body of electrolyte; an electrode having a lower conducting portion and an upper non-conducting portion positioned on top of and extending outwardly from one side of said lower portion at an angle of approximately 90 degrees; said lower portion extending along and confining one side of said body of electrolyte; and said upper portion extending along in contact with and confining a portion of the surface of said electrolyte and thereby constricting lines of current flow within said electrolyte to said lower conducting portion of said electrode.

References Cited in the file of this patent

UNITED STATES PATENTS

| | | |
|---|---|---|
| 2,014,566 | Haskill | Sept. 17, 1935 |
| 2,500,206 | Schaefer et al. | Mar. 14, 1950 |
| 2,547,950 | Lee et al. | Apr. 10, 1951 |
| 2,569,817 | Wolf et al. | Oct. 2, 1951 |
| 2,661,897 | Herzog et al. | Dec. 8, 1953 |

OTHER REFERENCES

Willoughby: "Some Applications of Field Plotting," I.E.E. Journal, vol. 93, part 3, July 1946; pages 287–291.

Mickelsen: "Automatic Equipment and Techniques for Field Mapping," Gen. Elect. Rev., Nov. 1949; pages 19–23.